UNITED STATES PATENT OFFICE.

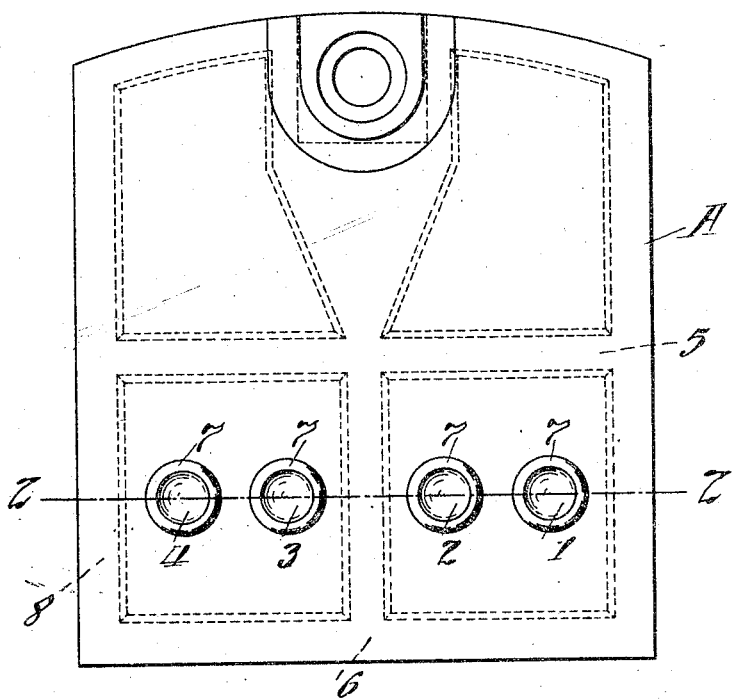
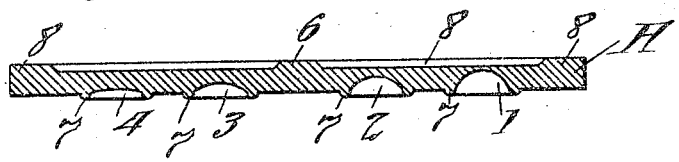

DEVEREUX ELMES, OF ORANGE, NEW JERSEY, ASSIGNOR TO NEW JERSEY PATENT COMPANY, OF WEST ORANGE, NEW JERSEY, A CORPORATION OF NEW JERSEY.

PRIMARY BATTERY.

1,138,363.  Specification of Letters Patent.  Patented May 4, 1915.

Application filed October 3, 1914. Serial No. 864,786.

*To all whom it may concern:*

Be it known that I, DEVEREUX ELMES, a citizen of the United States, and a resident of Orange, in the county of Essex and State of New Jersey, have invented certain new and useful Improvements in Primary Batteries, of which the following is a description.

My invention relates to primary batteries, being in some aspects an improvement on the invention disclosed in Patent No. 1,061,541, dated May 13, 1913, and granted to E. E. Hudson and myself, and the principal object thereof is to provide an improved electrode plate for such batteries so constructed as to give indication at any time of the approximate amount of energy that has been expended and the amount of energy still available, as well as to give indication of the approaching exhaustion of the plate.

Other features of my invention will be hereinafter more fully described and claimed.

My invention relates particularly to primary batteries of that class in which the negative electrode consists of a plate or plates of oxid of copper or other depolarizing agent and the positive electrode consists of a plate or plates of zinc. In batteries of this character, the positive plates wear away quite evenly during the electrolytic action.

The patent referred to above describes a positive plate formed with a small depression or small depressions of equal depth on the side thereof farthest away from the negative plate with which it coacts in the battery. Perforations in the positive plate due to the consumption thereof will obviously first appear in the depressed portion or portions of the plate, thereby indicating the approaching exhaustion of the plate and that the same will have to be renewed shortly. I have found that by providing a battery with a positive plate formed with a plurality of such depressions of different depths to thereby provide the plate with a plurality of reduced portions of different thicknesses, it is possible to obtain at any time a fairly accurate indication of the residual capacity of the battery. It is obvious that this plate will first become perforated where its thickness is the least, viz: at the depression having the greatest depth, and that with the progressive consumption of the plate, the latter will become perforated at the other depressions in the order of their depth. By making each depression of such a depth that in a given battery the plate will become perforated thereat after a certain predetermined amount of energy has been expended, an indication of the approximate amount of energy expended and that still available will be obtained; and I preferably make the depressions of such depths that the plate will become perforated thereat after the expenditure of 100, 200, 300 and 400 ampere hours respectively. The depressions are preferably surrounded by raised annular flanges or rims to enable the observer to quickly and readily locate the depressions and to offset the increased wearing away of the plate at the edges of the depressions by the action of the electrolyte.

In order that my invention may be more clearly understood, attention is hereby directed to the accompanying drawing forming part of this specification and in which:—

Figure 1 represents a side elevation of a positive electrode plate constructed in accordance with my invention; and Fig. 2 is a sectional view of the same on line 2—2 of Fig. 1.

Referring to the drawing, the positive electrode plate A is provided preferably on the side farthest away from the negative plate with which it coacts when assembled in a battery, with a number of depressions 1, 2, 3 and 4 of different depth, which are preferably circular and concave. These depressions are preferably provided in the panels formed by the horizontal and vertical ribs 5 and 6 and the flanges 8 with which the plate is preferably provided on the side nearest to the negative plate with which it coacts when assembled in a battery. Each of the depressions is surrounded by an annular rim or flange 7. It is evident that in use, the plate A will first become perforated at the reduced portion of least thickness or at depression 1, then at the reduced portion formed by depression 2, then at the reduced portion formed by depression 3, and finally at the reduced portion formed by the depression 4 of least depth when the plate has been nearly consumed or exhausted.

While I have described and illustrated the preferred embodiment of my invention, it is to be understood that this embodiment is subject to various changes and modifications without any departure from the spirit of the invention.

Means other than that described herein may be employed to locate the depressions. My invention is also not limited to batteries of the class hereinbefore described, but is applicable to any batteries using plates which wear away more or less evenly under the action of the electrolyte.

Having now described my invention, what I claim and desire to protect by Letters Patent is as follows:—

1. In a primary battery, an electrode plate having a plurality of reduced portions of different thickness to indicate the extent of energy expenditure by the appearance of perforations in said reduced portions during the consumption of the plate, substantially as described.

2. As a new article of manufacture, an electrode plate for a voltaic battery having means for visually indicating the extent of energy expenditure and the quantity of energy still available, comprising a plurality of depressions of different depth, substantially as described.

3. As a new article of manufacture, an electrode plate for a voltaic battery having means for visually indicating the extent of energy expenditure and the quantity of energy still available, comprising a plurality of depressions of different depth and means for indicating the location of said depressions, substantially as described.

4. In a primary battery, a positive electrode plate having a plurality of depressions of different depth on the side farthest away from the negative element with which it coacts, the plate being thereby formed with a plurality of reduced portions of different thickness, whereby the extent of energy expenditure will be indicated by the appearance of perforations through said reduced portions, substantially as described.

5. As a new article of manufacture, an electrode plate for a voltaic battery having means for visually indicating the extent of energy expenditure and the quantity of energy still available, comprising a plurality of depressions of different depth, and raised rims surrounding said depressions, substantially as described.

6. In a primary battery, an electrode plate having a plurality of reduced portions of different thickness to indicate the extent of energy expenditure by the appearance of perforations in said reduced portions during the consumption of the plate, and means for indicating the location of said reduced portions, substantially as described.

This specification signed and witnessed this 2nd day of October 1914.

DEVEREUX ELMES.

Witnesses:
WILLIAM A. HARDY,
MARY J. LAIDLAW.